United States Patent [19]

Nishida et al.

[11] Patent Number: 4,570,202

[45] Date of Patent: Feb. 11, 1986

[54] GAS-INSULATED SWITCHGEAR EQUIPMENT

[75] Inventors: Isao Nishida; Koji Sasaki, both of Hitachi; Seizo Nakano, Mito; Shigetaka Takeuchi, Hitachi; Takeshi Takahashi, Hitachiota, all of Japan

[73] Assignee: Hitachi, Ltd., Tokyo, Japan

[21] Appl. No.: 434,553

[22] Filed: Oct. 15, 1982

[30] Foreign Application Priority Data

Oct. 16, 1981 [JP] Japan .................. 56-166190

[51] Int. Cl.[4] .................. H02B 1/04; H01H 33/88
[52] U.S. Cl. .................. 361/333; 200/148 A; 200/148 B; 200/148 F; 200/145; 361/131
[58] Field of Search .......... 200/148 A, 148 B, 148 F, 200/148 D, 145; 361/333, 332, 335, 131

[56] References Cited

U.S. PATENT DOCUMENTS

| | | | |
|---|---|---|---|
| 3,071,671 | 1/1963 | Leeds | 200/148 B |
| 4,032,820 | 6/1977 | Oishi et al. | 361/333 |
| 4,045,634 | 8/1977 | Nakano et al. | 200/148 B |
| 4,075,447 | 2/1978 | Rostron | 200/148 A |
| 4,236,053 | 11/1980 | Sasaki et al. | 200/148 A |
| 4,291,363 | 9/1981 | Oishi | 361/333 |
| 4,307,273 | 12/1981 | Sasaki et al. | 200/148 A |

FOREIGN PATENT DOCUMENTS

| | | | |
|---|---|---|---|
| 43-18806 | 8/1968 | Japan | 200/144 AP |
| 57-17470 | 4/1982 | Japan . | |

Primary Examiner—Robert S. Macon
Attorney, Agent, or Firm—Antonelli, Terry & Wands

[57] ABSTRACT

A plurality of breaking portions forming a vertically-disposed circuit breaker are connected in series and open and close the circuit within a gas-tight sealed enclosure. The enclosure is provided at its both sides with openings for connection of one and the other ends of the breaking portions, to which openings main bus bars and an insulated-led-out device are connected, respectively. The breaking portions each have a fixed contactor and a movable contactor, and the movable contactor is put into contact with or is separated from the fixed contactor by moving the movable contactor upward or downward under control of an operating device.

8 Claims, 6 Drawing Figures

OPERATING DEVICE

GAS-INSULATED SWITCHGEAR EQUIPMENT

The present invention generally relates to a gas-insulated switchgear equipment with a large capacity, and more specifically, to a switchgear equipment in which a plurality of circuit breaking portions forming a gas circuit breaker are connected in series to open and close the circuit within a gas-tight sealed enclosure.

In a gas-insulated switchgear equipment based on a prior-art vertically-disposed circuit breaker, conductor leading-out openings are formed on one side of an enclosure at its upper and lower positions. The enclosure hermetically contains therein vertically-disposed gas circuit breaking portions connected in series. Two main bus bars are connected through disconnecting switches to a lower one of the openings, and an insulated-led-out device including a cable head and a bushing is connected to an upper one of the openings. However, with such an arrangement, the conductor leading-out openings are provided only on one side of the enclosure in an upper and lower positional relation and thus the insulated-led-out device connected to the upper opening must be disposed to extend over the two main bus bars, whereby the total length of bus bars necessary to connect the upper opening to the insulated-led-out device will become relatively long, for example, about 3.5 to 4 m, uneconomically increasing the quantity of connecting bus bars to be used. Further, since a plurality of gas circuit breaking portions are connected in series within the sealed enclosure in its axially upper and lower positional relation, the enclosure unfavorably has a height of about 4 m and thus the prior art gas-insulated switchgear equipment will be unstable when subjected to earthquakes.

Accordingly, it is an object of the present invention to reduce the necessary length of bus bars to be connected to a plurality of vertically-disposed gas circuit breaking portions to thereby minimize its mounting space by connecting the plural circuit breaking portions in series which open and close the circuit within a gas-tight sealed enclosure, by providing openings on both sides of the enclosure for connection with one end of the breaking portions, and by connecting main bus bars and an insulated-led-out device to the respective openings.

Another object of the invention is to reduce the height of the sealed enclosure to thereby make resistive to earthquakes.

Preferred embodiments of the present invention will now be described in conjunction with the accompanying drawings, in which.

Figure 1:
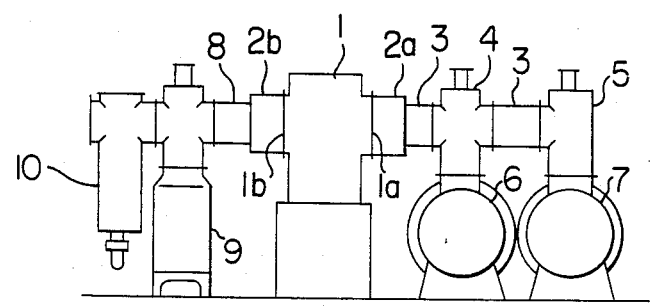
FIG. 1 is a front view of an embodiment of a gas-insulated switchgear equipment in accordance with the present invention.

Referring first to FIG. 1, there is shown a front view of an embodiment of a gas-insulated switchgear equipment in accordance with the present invention. In the figure, a vertically-disposed circuit breaker 1 comprises circuit breaking portions and is housed in an enclosure. The enclosure in turn is hermetically filled therein with a gas, typically, a sulfur hexafluoride ($SF_6$) gas. The enclosure is provided at its both sides with openings 1a and 1b through which conductors are led out at substantially the same horizontal level. Current transformers 2a and 2b are mounted on the openings 1a and 1b, respectively. The transformer 2a (on the right side in the figure) is connected through short connecting bus bars 3 with respective disconnecting switches 4 and 5 which are further connected to respective main bus bars 6 and 7 carried on mounting bases. On the other hand, the current transformer 2b (on the left side in the figure) is coupled through a short connecting bus bar 8 with a lightning arrester 9 and an insulated-led-out device 10 such as a cable head.

As seen from FIG. 1, the bus bars 3 and 8 for connection to the main bars 6 and 7 and the insulated-led-out device 10 are placed in a linear arrangement when compared with those in a prior art equipment and thus can be made very short, for example, about 35 cm. For this reason, the gas-insulated switchgear equipment can be made smaller in its whole mounting area or space and can be reduced remarkably in its height to about 2.5 m. With respect to the height, in particular, the height of the connecting bus bars 3 and 8 are substantially the same as that when the gas circuit breaker 1 is of the one breaking point type wherein the circuit breaker has one breaking point. This fact is very important because the gas circuit breaker has a plurality of breaking points, which will be detailed later.

Figure 2:
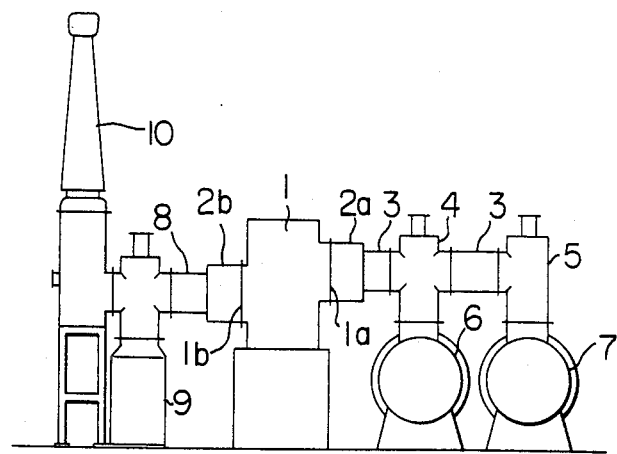
FIG. 2 is a front view of another embodiment of the switchgear equipment of the present invention.

FIG. 2 shows another embodiment of the gas-insulated switchgear equipment wherein bus bar lead-out portions formed on the both sides of the gas circuit breaker 1 are different in height. More specifically, the height of the lead-out portion 8 on the side of the insulated-led-out device 10 is lower than that of the lead-out portion 3 on the side of the main bars 6 and 7. Therefore, it should be understood that the heights of the lead-out points 8 and 3 on the both sides of the circuit breaker 1 do not necessarily have to be equal to each other.

Figure 3:
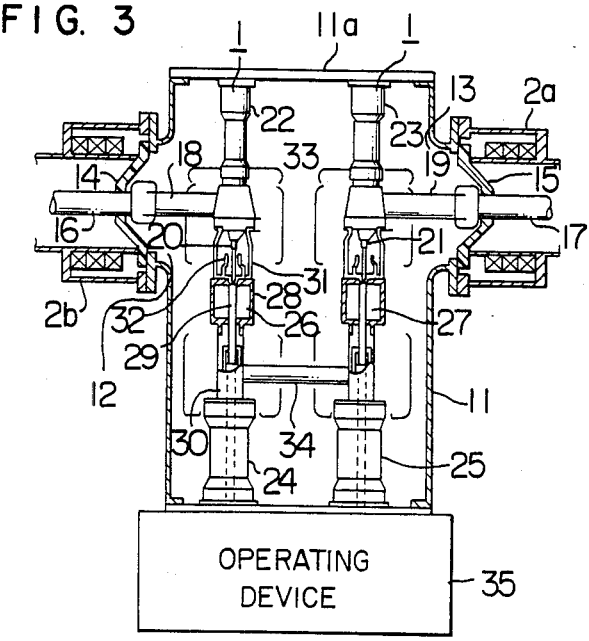
FIG. 3 is a sectional view of a first embodiment of a vertically-disposed circuit breaker used in the present invention.

Turning next to FIG. 3, there is shown a vertical sectional-view of a first embodiment of the gas circuit breaker 1 in FIG. 1, wherein an enclosure sealingly containing the gas circuit breaker 1 is formed at its both sides with openings 12 and 13 through which conductors are led out substantially at a horizontal level. The openings 12 and 13 are hermetically sealed respectively by insulating spacers 14 and 15 on which the current transformers 2a and 2b are mounted. Conductors 16 and 17 passing through the centers of the insulating spacers 14 and 15 have their one ends coupled to respective conductors 18 and 19. Other ends of the conductors 18 and 19 are coupled to respective terminals of two breaking portions having two breaking points connected in series. Fixed contactors 20 and 21 in the two breaking portions are secured to an upper cover 11a of the sealing enclosure 11 respectively by insulating supporters 22 and 23. Below the supporters 22 and 23 and within the enclosure 11, are disposed other insulating supporters 24 and 25 so as to have substantially the same axial lines as the supporters 22 and 23, respectively. The supporters 24 and 25 carry thereon associated pistons 26 and 27 fixedly. The following explanation will be directed only to the left breaking portion (in the figure)

because the breaking portions are identical in structure. The fixed piston 26 is surrounded by a slidable cylinder 28, whereby gas compressing means is formed. The cylinder 28 is coupled to an insulated operating rod 30 through a shaft 29 passing through the center of the cylinder 28. The operating rod 30 is operatively associated with a common operating device 35 to allow its up and down movements. The cylinder 28 is mounted with a movable contactor 31 which in turn is surrounded by an insulated nozzle 32. This type of breaking portion is well known as a puffer type one. The above-mentioned gas compressing means and the insulated nozzle 32 form a gas blowing mechanism. A gas shield 33 is provided to prevent that the gas after having acted on arc will not affect adversely the adjacent breaking portion. Both breaking portions are structurally independent, though their operating movements are linked to each other. A connecting conductor 34 is provided between the pistons 26 and 27 to connect the two breaking portions in series and also desirably to link the both mechanically.

Since the present invention makes full use of the features of the two-breaking point type, i.e., both breaking portions are arranged so that the contacts thereof can open and close on respective parallel and vertical lines, both ends of the breaking portions can be guided out of the sealed enclosure 11 at substantially the same level by means of the conductors 18 and 19. On the other hand, even if electromagnetic forces generate, the arrangement of the present invention can have a structural strength to withstand the forces.

Figure 4:
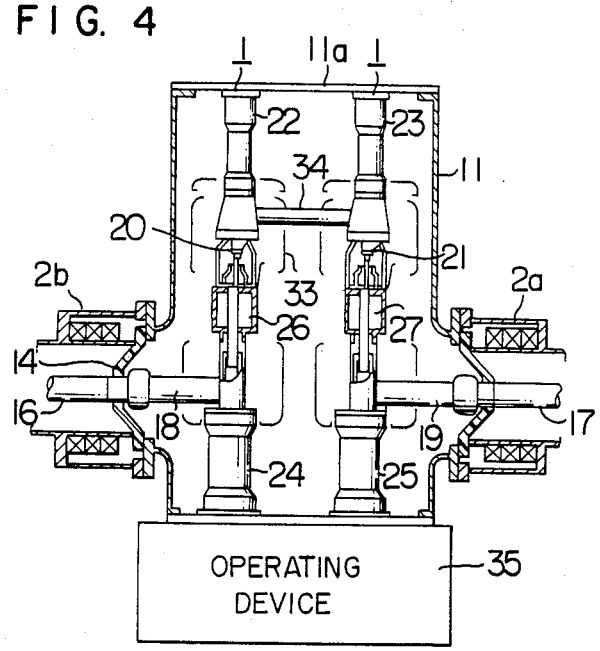
FIG. 4 is a sectional view of a second embodiment of the circuit breaker in the present invention.

There is shown a second embodiment of the vertically-disposed gas circuit breaker used in the present invention in FIG. 4 wherein the conductor 34 is connected between conductors in the vicinity of the fixed contactors 20 and 21 in order to electrically connect the two breaking portions in series. Additionally, both ends of the breaking portions are guided or led out of the enclosure 11 at the lower side wall thereof in substantially the same horizontal level relation to each other by the conductors 18 and 19. In comparison with FIG. 3, the connecting conductor 34 and the conductors 18 and 19 in FIG. 4 are opposite in positional arrangement.

This embodiment is effective when it is desirable to provide the main bus bars 6 and 7 at a higher position in the switchgear equipment, when it is desirable to decrease the height of the disconnecting switches 4 and 5 in FIG. 1, and when it is desirable to increase the height of the operating device 35.

Figure 5:
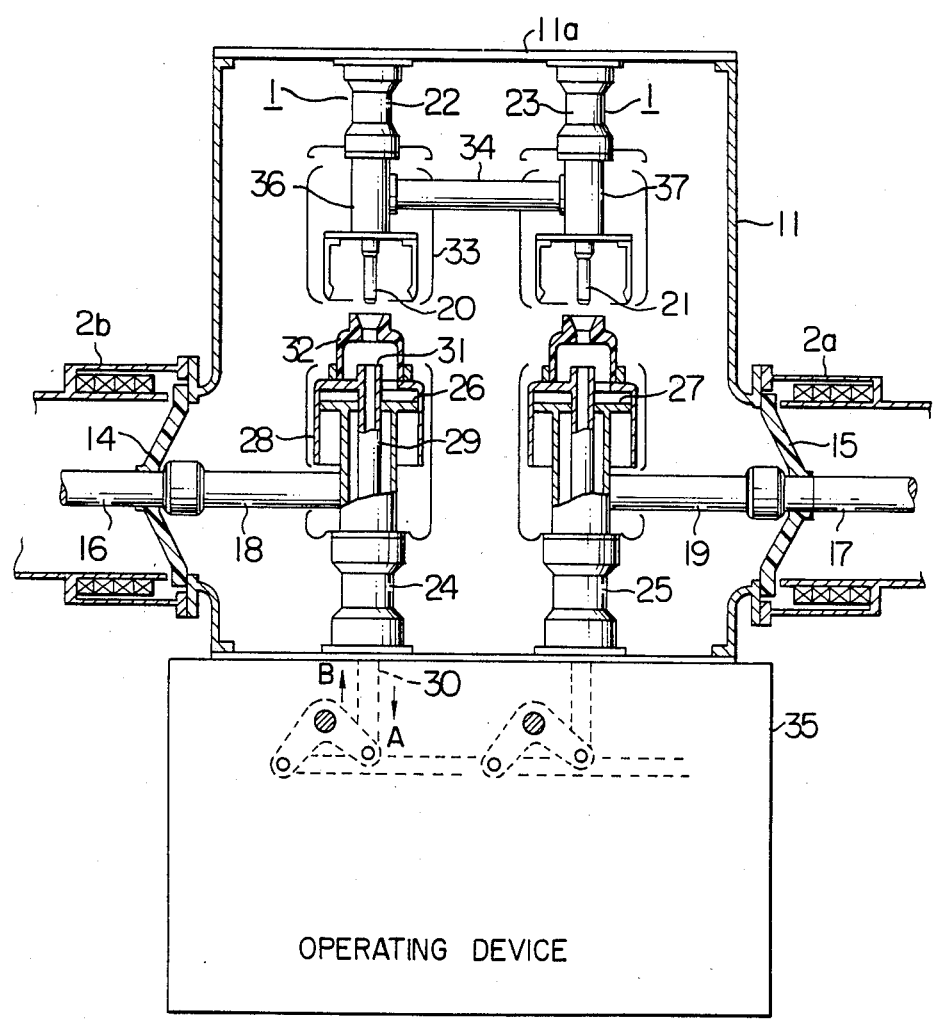
FIG. 5 is a more detailed sectional view of FIG. 4.

Referring next to FIG. 5, there is shown a more detailed view of the vertically-disposed circuit breaker of FIG. 4. In FIG. 5 and FIG. 4, like reference numerals denote like parts or elements. First, the opening operation of the breaking portion will be explained. When the insulated operating rod 30 within the operating device 35 is moved in a downward direction shown by an arrow A, the cylinder 28 will move downward, whereby gas in a chamber defined above the piston 26 will be compressed and the compressed gas will be blown toward the stationary contactor 20 out of the insulated nozzle 32. As a result, an arc generated between the stationary and movable contactors 20 and 31 will be extinguished by the blown gas. On the other hand, when the insulated operating rod 30 is moved in such an upward direction as shown by an arrow B, the nozzle 32 and the cylinder 28 will move upward, whereby the movable contactor 31 will come into contact with the fixed contactor 20, completing its closing operation. Upon the closing operation, the gas in the chamber will not affect the fixed contactor 20.

Figure 6:
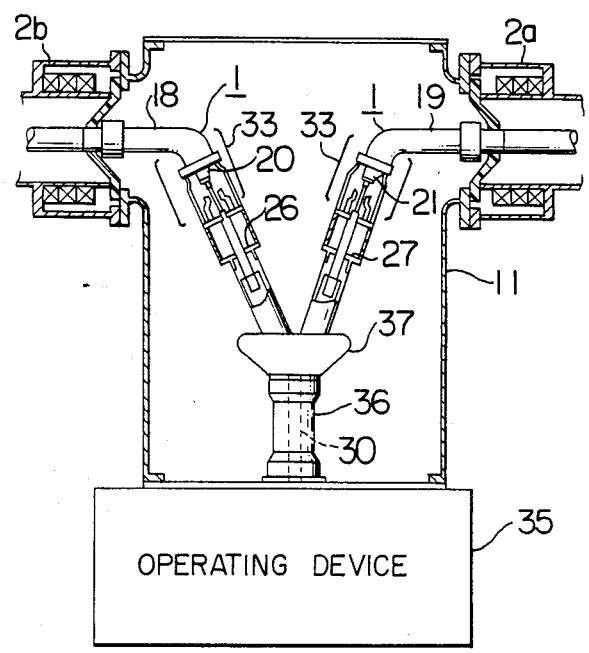
FIG. 6 is a sectional view of a third embodiment of the circuit breaker used in the present invention.

FIG. 6 shows a third embodiment of the vertical gas circuit breaker in accordance with the present invention. In this embodiment, the insulated supporters 24 and 25 and the insulated operating rod 30 in FIG. 3 are used commonly for its two breaking portions. More particularly, an insulated supporter 36 is provided below the two breaking portions and within the enclosure 11 so that the pistons 26 and 27 in the two breaking portions are secured to a bracket 37 mounted on the insulator 36. Since the operating rod 30 must be linked to ends of a link mechanism housed in the bracket 37 in this embodiment, lower ends of the two breaking portions are disposed in a closer relation to each other and upper ends, i.e., the fixed contactors 20 and 21 thereof are disposed in a farther relation from each other.

With such an arrangement, the gases used for extinction of arcs in the two breaking portions are ejected in mutually diverging directions from each other, and thus interference between the ejected gases can be eliminated. However, in order to remove possibility of the gas interference due to the spacers 14 and 15, the gas shields 33 are added in the similar manner to those in FIG. 3. In order to support the fixed contactors 20 and 21, further, the insulated supporters 22 and 23 may be provided in the similar manner to those in FIG. 3.

In the embodiments of FIGS. 3, 5 and 6 described in the foregoing, explanation has been made in connection with the case where the circuit breaker of the present invention is applied to the two-breaking-point type. However, the invention may be similarly applied to another plural-breaking-point type. When the number of plural breaking points is odd, in particular, the circuit breaker must have conductor leading-out openings on the opposite sides of the enclosure at its upper and lower levels and thus the two breaking portion conductors must be guided out of the sealed enclosure 11 in a relation shifted in the height direction of the enclosure. In order to compensate for this shift, the conductor leading-out openings are provided on the opposite sides of the enclosure at the same level and between the upper and lower levels so that the curved conductors 18 and 19 are guided or led out of the enclosure through their openings.

As has been disclosed in the foregoing, in accordance with the present invention, a plurality of circuit breaking portions are arranged so as to open and close the circuit on different vertical lines within the sealed enclosure, and thus the gas circuit breaker in the gas-insulated switchgear equipment of the invention can be arranged at the same height or level as a prior-art gas circuit breaker of one-breaking-point type. This can be accomplished by placing the main bus bars and the insulated-led-out device on both sides of the circuit breaker. As a result, the length of bus bars necessary for circuit breaker connection can be shortened and the whole height of the gas-insulated switchgear equipment can be lowered, whereby the switchgear equipment of the invention can be advantageously assembled economical and be highly resistive to earthquakes because of its structure.

What is claimed is:

1. A gas-insulated switchgear equipment comprising: a plurality of vertically disposed circuit breaking portions connected in series with one another for opening and closing the circuit, said circuit breaking portions having an upper position and a lower position in the vertical direction;

an enclosure for gas-tight sealing said circuit breaking portions;

disconnecting switches connected through respective connecting bus bars to one end of said circuit breaking portions on one side of said enclosure;

main bus bars connected respectively to said disconnecting switches;

insulated-led-out means connected through a connecting bus bar to the other end of said circuit breaking portions on the other side of said enclosure;

conductors connected so as to extend transversely to said vertically disposed circuit breaking portions at one of the upper and lower positions of said circuit breaking portions; and insulating supporters for fixing said circuit breaking portions to said enclosure.

2. A gas-insulated switchgear equipment as set forth in claim 1 wherein the both ends of said circuit breaking portions are led out of said enclosure at substantially the same horizontal level.

3. A gas-insulated switchgear equipment as set forth in claim 1 wherein said circuit breaking portions are even in number.

4. A gas-insulated switchgear equipment as set forth in claim 3 wherein said circuit breaking portions respectively have fixed contactors at the upper portions of each of said circuit breaking portions, and said conductors are connected to said fixed contactors and are led out of said enclosure at the both ends of said circuit breaking portions.

5. A gas-insulated switchgear equipment as set forth in claim 1 wherein said circuit breaking portions comprises a pair of fixed and movable contactors, a blowing mechanism for blowing compressed gas toward an arc generated upon separation between said contactors to thereby extinguish said generated arc, and gas shields for limiting the flow of said gas after having acted on said arc.

6. A gas-insulated switchgear equipment as set forth in claim 3 wherein each of said circuit breaking portions has a fixed contactor provided at the upper position thereof and a movable contactor provided at the lower position thereof, a cylinder carrying the movable contactor, an insulated operating rod for fixedly supporting said cylinder in a relation insulated from said enclosure, and an operating device operatively coupled to said operating rod for making contact or separation between the movable and fixed contactors when the movable contactor is moved upward or downward, and wherein said conductors are led out of the enclosure at the both ends of said circuit breaking portions.

7. A gas-insulated switchgear equipment as set forth in claim 5 wherein said circuit breaking portions include two breaking points and the circuit breaking portions are arranged so that a spacing between their fixed contactors is wider than a spacing between their movable contactors.

8. A gas-insulated switchgear equipment as set forth in claim 1 wherein one end of said circuit breaking portions on the side of said main bus bars is lower than the other end of the breaking portions on the side of said insulated-led-out means to lead said conductors out of said enclosure.

* * * * *